UNITED STATES PATENT OFFICE.

WILLIAM MOORE, OF ST. PAUL, MINNESOTA.

INSECTICIDE.

1,376,153. Specification of Letters Patent. Patented Apr. 26, 1921.

No Drawing. Application filed December 11, 1919. Serial No. 344,238.

*To all whom it may concern:*

Be it known that I, WILLIAM MOORE, a citizen of the United States, resident of St. Paul, Ramsey county, Minnesota, have invented certain new and useful Improvements in Insecticides, of which the following is a specification.

This invention relates to insecticides for treating plants for protection against destructive insects, fungi and other pests. Herein, the term plants is used in a broad sense to include not only the herbaceous varieties of plants, but also trees, shrubs, and the like. The term insecticide is also comprehensively used to include fungicides.

At the present time great difficulty is experienced with certain kinds of insecticides in plant treatment in that the insecticide is very easily and quickly washed from the foliage or stems or other portions of a plant by rain or dew. At present, various arsenicals such as Paris green, lead arsenate, calcium arsenate, and zinc arsenite are in general use either in powder form or as sprays for the control of various insect pests. These preparations are all insoluble or but slightly soluble in water, but in spite of their insolubility, they are more or less readily washed off the plants by rain. If a rain occurs within a short time after spraying, the arsenical is washed away before the insects have eaten a killing dose, thus making a second and sometimes a third spraying necessary.

It is known that various substances when wet with water take on an electric charge, such charge being either positive or negative in character, the latter being the more common. Glass, carbohydrates, paper, leaves, are examples of substances showing a negative electric charge when wet. Arsenicals such as Paris green and lead arsenate also, when suspended in water for spraying purposes, show a negative charge.

It is elemental that like electric charges repel while unlike attract. Extensive experimentation has shown that this general principle may be successfully applied to insecticides.

As the foliage of all plants, so far as known to me, has when wet a negative electric charge, I prefer to provide an insecticide which will have, when applied to the plants, a positive charge, whereby the insecticide will adhere to, and will not be readily washed off from the plants. To this end I form an insecticide of a metallic arsenical, such as the arsenates, and arsenites of iron, aluminum, chromium, lead, zinc, magnesium, copper, or calcium, by treating such metallic arsenical with a metallic salt, or a metallic base, in the presence of water, which treatment may take place at the time of, or after, the formation of the arsenical. An insecticide thus formed will have an electric charge positive in character, due to the adsorption, by the metal of the arsenical of a metallic ion or a metallic hydroxid, or oxid, which has previously adsorbed a metallic ion. The essential point is the metallic ion, adsorbed, either directly or indirectly, by the metal of the arsenical. This metallic ion need not be the same metal as that of the arsenical. As an illustration, a copper ion can give a positive electric charge to a ferric arsenate preparation.

Because of injury to the plants by chemicals in a crystalloid or ionic solution, it is desirable to use them in an insoluble form. Insoluble materials of this character may be suspended in the water in the form of small particles visible to the naked eye or by means of a microscope (suspensions) or in very small particles only visible under the ultra-microscope (suspensoids). Most of the common materials in the form of suspensions or suspensoids carry a negative electric charge. Certain compounds of iron, aluminum or chromium with a valence of three, and certain of the rarer metals such as cerium with a valence of four, produce electrically positive suspensoids and suspensions.

For example, the addition of a small quantity of ammonia to a five per cent. solution of ferric chlorid results in the formation of a precipitate of ferric hydroxid, which, on being shaken or allowed to stand for a short period, is peptized or redissolved, forming a colloidal solution or suspensoid of ferric hydroxid or oxid. Further addition of ammonia produces similar reactions as long as the ferric chlorid is present in excess. This suspensoid carries a positive charge due to the adsorption of the ferric ion of the ferric base present in the ferric chlorid. If, instead of peptizing the ferric hydroxid, it is filtered off, it can be suspended in water and the suspension will have a positive electric charge.

Similar preparations can be made using aluminum chlorid or chromium sulfate in which case suspensoids or suspensions of aluminum hydroxid and chromium hydroxid are formed. These also have a positive electric charge.

As above noted, the arsenicals commonly used in insecticides such as Paris green and lead arsenate, when suspended in water for spraying purposes, show a negative charge and, as the very large number of plants so far tested also uniformly show a negative charge when wet, there obviously is an active repulsion between the two substances and this phenomena accounts for the readiness with which the insecticides is washed off. Hence, in the treatment of plants which, so far as the inventor hereof is aware, all show a negative electric charge when wet, it is either necessary to treat the plants initially, to change the character of their electric charge or to change the character of the electric charge of the insecticide. The latter is decidely the more practical.

The addition of any of the above-mentioned hydroxids, as, for example, ferric hydroxid, to a suspension of lead arsenate before spraying—using one pound of the ferric hydroxid to one and one-half pounds of lead arsenate to fifty gallons of water—will give the mixture a positive charge, and increase its adherence to the leaves of the plants so sprayed. One disadvantage, it must be observed, is the speed with which the suspension settles in the spraying tank. This difficulty is overcome by the direct manufacture of a positively charged arsenical. A colloidal solution or suspensoid of ferric arsenate may be made by adding an equal quantity of a five per cent. solution of sodium arsenate to a five per cent. ferric chlorid solution, adding a small quantity at one time and shaking until all the precipitate formed is peptized. This suspensoid has a positive charge and consists of ferric arsenate with an adsorbed ferric ion obtained from the ferric base present in the ferric chlorid. Similarly, ferric arsenite may be made from sodium arsenite and ferric chlorid, and aluminum arsenate or arsenite from sodium arsenate or arsenite and aluminum chlorid.

Ferric arsenate in the form of a fine suspension may be made by adding seven hundred and fifty parts of a twenty per cent. solution of sodium arsenate to eight hundred parts of a fourteen per cent. solution of ferric chlorid. A fine precipitate is formed which may be filtered or centrifuged and washed to remove any traces of soluble or dialyzable arsenic. This material may then be used directly as a spray in the proportions used in spraying with arsenicals. It is more toxic than lead arsenate, and shows a greater adherence to the plant.

Ferric arsenite may be made by adding five hundred parts of an eight per cent. solution of sodium arsenite to eight hundred parts of a fourteen per cent. solution of ferric chlorid. This shows similar properties to the ferric arsenate but is more apt to contain soluble arsenic which will burn the foliage.

Aluminum arsenate is made by adding five hundred parts of a twenty per cent. solution of sodium arsenate to seven hundred parts of a six per cent. solution of aluminum chlorid. In a similar manner aluminum arsenite can be made from aluminum chlorid and sodium arsenite; chromium arsenate or arsenite from sodium arsenate or arsenite and chromium sulfate; and the cerium arsenate or arsenite from a soluble cerium salt such as the chlorid and sodium arsenate or arsenite. The chromium arsenate can be made also by adding ten parts of a two per cent. solution of sodium arsenate to ten parts of a three per cent. solution of sodium or potassium dichromate.

All of these preparations form insecticides that are positively charged and adhere to the plants and their foliage and resist the action of rain or dew better than any of the many arsenical insecticides in use which have been tested. Furthermore, it may be noted that these novel insecticides show varying degrees of toxicity to insects and also to plants, and hence can be adapted to particular conditions. It is further to be understood that this insecticide may be applied directly in the form of a powder, instead of a suspension in water. In such case the powder is deposited upon the plant or, as commonly stated, the plant surface may be dusted with such powder. A powder can be formed in accordance with this invention which will be capable of assuming, when placed on a plant and wet by dew, rain or the artificial application of water, an electric charge opposite in character to that of the moistened plant surface.

Having thus described my invention, what I claim as new and desire to secure by Letters Patent, is:

1. An insecticide consisting of a metallic arsenical containing an adsorbed metallic ion.

2. An insecticide consisting of a metallic arsenical containing a metallic hydroxid, and an adsorbed metallic ion.

3. An insecticide consisting of a metallic arsenical containing an adsorbed metallic ion, the metal of the ion being the same as the metal of the arsenical.

4. An insecticide consisting of a metallic arsenical containing a metallic hydroxid, and an adsorbed metallic ion, the metal of the ion and the hydroxid being the same as the metal of the arsenical.

5. An insecticide consisting of a ferric arsenical containing an adsorbed metallic ion.

6. An insecticide consisting of a ferric arsenical containing an adsorbed ferric ion.

7. An insecticide consisting of a ferric arsenical containing ferric hydroxid and an adsorbed ferric ion.

8. An insecticide consisting of a metallic arsenical, and a metallic salt forming, in the presence of water, an adsorbed metallic ion.

In witness whereof, I have hereunto set my hand this 8th day of December, 1919.

WILLIAM MOORE.